United States Patent
Sato

(10) Patent No.: US 8,314,955 B2
(45) Date of Patent: Nov. 20, 2012

(54) APPARATUS AND METHOD FOR REQUESTING PASSWORD RE-ENTRY FOR EXTERNAL-DEVICE DISPLAY AND NOT REQUESTING PASSWORD RE-ENTRY FOR IMAGE DISPLAY ON DISPLAY UNIT OF THE APPARATUS

(75) Inventor: Hirochika Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 12/198,468

(22) Filed: Aug. 26, 2008

(65) Prior Publication Data

US 2009/0059268 A1    Mar. 5, 2009

(30) Foreign Application Priority Data

Aug. 30, 2007   (JP) .................................. 2007-224024

(51) Int. Cl.
*G06K 15/00* (2006.01)
(52) U.S. Cl. ............ 358/1.14; 705/2; 705/3; 705/14.38; 705/304; 713/171
(58) Field of Classification Search ................. 358/1.14, 358/1.15, 1.16; 705/2, 3, 14.38, 304
See application file for complete search history.

(56) References Cited

U.S. PATENT DOCUMENTS

| | | | |
|---|---|---|---|
| 5,684,277 A | 11/1997 | Tokioka et al. | |
| 5,744,760 A | 4/1998 | Kobayashi et al. | |
| 6,255,604 B1 | 7/2001 | Tokioka et al. | |
| 6,384,814 B1 | 5/2002 | Kobayashi et al. | |
| 7,835,026 B2* | 11/2010 | Suzuki | 358/1.18 |
| 2002/0108108 A1* | 8/2002 | Akaiwa et al. | 725/30 |
| 2003/0179399 A1* | 9/2003 | Matsunoshita | 358/1.13 |
| 2004/0125402 A1* | 7/2004 | Kanai et al. | 358/1.15 |
| 2004/0165207 A1* | 8/2004 | Kashiwagi | 358/1.13 |
| 2005/0179960 A1* | 8/2005 | Obana et al. | 358/449 |

(Continued)

FOREIGN PATENT DOCUMENTS

JP    10-248045 A    9/1998

(Continued)

OTHER PUBLICATIONS

English Machine Translation of JP 2003-280469-A ( Matsunoshita, published Oct. 2, 2003).*

(Continued)

*Primary Examiner* — Benny Q Tieu
*Assistant Examiner* — Juan Guillermety
(74) *Attorney, Agent, or Firm* — Fitzpatrick, Cella, Harper & Scinto

(57) ABSTRACT

The image forming apparatus decodes a two dimensional code within an image and obtains a password; stores the image in a storage unit if the password thus obtained matches a password entered through an operating section; and when an instruction is given by a user to display the image stored in the storage unit on a display unit of the image forming apparatus, displays the image on the display unit of the image forming apparatus without requesting an entry of the obtained password, and when an instruction is given by a user to display the image stored in the storage unit on a display unit of an external device, other than the display unit of the image forming apparatus, requests re-entry of the password for displaying the image on the display unit of the external device.

8 Claims, 19 Drawing Sheets

U.S. PATENT DOCUMENTS

2006/0012579 A1    1/2006   Sato
2007/0028100 A1*   2/2007   Sato ............................. 713/165

FOREIGN PATENT DOCUMENTS

| | | |
|---|---|---|
| JP | 2003-280469 | 10/2003 |
| JP | 2006-332826 A | 12/2006 |

OTHER PUBLICATIONS

Japanese Office Action issued by the Japanese Patent Office, dated Dec. 16, 2011, issued in counterpart Japanese Patent Application No. 2007-224024.

Japanese Office Action dated Sep. 11, 2012, issued by the Japanese Patent Office, in Japanese Patent Application No. 2007-224024.

* cited by examiner

| TYPE | DATA SIZE |
|---|---|
| FIRST INFORMATION | SMALL |
| SECOND INFORMATION | LARGE |

APPARATUS AND METHOD FOR REQUESTING PASSWORD RE-ENTRY FOR EXTERNAL-DEVICE DISPLAY AND NOT REQUESTING PASSWORD RE-ENTRY FOR IMAGE DISPLAY ON DISPLAY UNIT OF THE APPARATUS

BACKGROUND OF THE INVENTION

1. Field of the Invention

The present invention relates to an image forming apparatus capable of handling a two dimensional code, a control method thereof, and a storage medium therefor.

2. Description of the Related Art

A technology (as disclosed in, for example, Japanese Patent Laid-Open No. 2003-280469) of restricting a copy of printed material by using a two dimensional code has heretofore been known. In this conventional technology, the following processing is performed.

(1) First, a password is encoded so that a two dimensional code is obtained, and printed material on which the obtained two dimensional code is printed is scanned by a scanner of an image forming apparatus.

(2) Next, if the two dimensional code is detected in image data obtained by the scanning, the two dimensional code is decoded so that the password is obtained.

(3) Thereafter, a user of the image forming apparatus is requested to input a password. At this time, the password inputted by the user through an operating section of the image forming apparatus is compared with the password obtained by decoding the two dimensional code, and only if both match each other, the image data obtained by the scanning are stored in a storage device of the image forming apparatus.

In this manner, the above-described conventional technology provides a system in which copying is restricted when image data is to be stored in the storage device of the image forming apparatus.

In the above-described conventional technology, the storing of a copy can be restricted when control is performed, as a job, in which printed material with a two dimensional code printed thereon is read and outputted. However, a copy cannot necessarily be prevented from being stored in the following case.

For example, suppose that there is an image forming apparatus which performs two control operations with different jobs: one being performed on the storing, in a storage device of the image forming apparatus, of image data obtained by reading printed material embedded with a two dimensional code; the other being performed on the outputting of the image data from the storage device of the image forming apparatus. In such an image forming apparatus, when the image data stored in the storage device are transmitted to an external device by file transfer or by fax, there is a problem that a copy can be made with use of printing means on the side of the external device.

Further, when browsing image data of an image forming apparatus using a display function of the image forming apparatus, there is no problem; however, when browsing image data of the image forming apparatus using an external device, there is a problem where a copy can be made using screenshot means and printing means of the external device.

SUMMARY OF THE INVENTION

An object of the invention is to solve the above-described problems. Therefore, to solve the above-described problems, the invention can be configured as follows.

According to a first aspect of the present invention, there is provided an image forming apparatus including a display unit, comprising: a decoding unit configured to decode a two dimensional code within an image; a storage control unit configured to perform a control to store the image in a storage unit if the correctness of the password entered through an operating section is authenticated by the information obtained by the decoding of the decoding unit; and a control unit configured to perform, when an instruction is given by a user to display the image stored in the storage unit on the display unit, a control to display the image on the display unit without requesting re-entry of the password, and to perform, when an instruction is given by a user to display the image stored in the storage unit on a display unit of an external device, other than the display unit, a control to request re-entry of the password for displaying the image on the display unit of the external device.

In the second aspect of the present invention, there is provided a control method for an image forming apparatus including a display unit, comprising the steps of: decoding a two dimensional code within an image; performing a control to store the image in a storage unit if the correctness of a password entered through an operating section is authenticated by the information obtained by the decoding; and performing, when an instruction is given by a user to display the image stored in the storage unit on the display unit, a control to display the image on the display unit without requesting re-entry of the password, and performing, when an instruction is given by a user to display the image stored in the storage unit on a display unit of an external device, other than the display unit, a control to request re-entry of the password for displaying the image on the display unit of the external device.

In the third aspect of the present invention, there is provided a computer-readable storage medium with a control program stored therein, the control program causing a control unit included in an image forming apparatus to perform the steps of: decoding a two dimensional code within an image and; performing a control to store the image in a storage unit if the correctness of a password entered through an operating section is authenticated by the information obtained by the decoding; and performing, when an instruction is given by a user to display the image stored in the storage unit on the display unit, a control to display the image on the display unit without requesting re-entry of the password, and performing, when an instruction is given by a user to display the image stored in the storage unit on a display unit of an external device, other than the display unit, a control to request re-entry of the password for displaying the image on the display unit of the external device.

In the forth aspect of the present invention, there is provided an image forming apparatus comprising: a password obtaining unit configured to decode a two dimensional code within an image so as to obtain a password; and a setting unit configured to set, when transmitting data of the image to the outside, the password obtained by the password obtaining unit as a password for the entire image.

In addition, the steps in the respective control methods of the image forming apparatus in accordance with the present invention can be configured as a program which is performed by a computer serving as control means included in the image forming apparatus. Then, causing the computer to read the program enables the computer to carryout the control method. In addition, the program can be read into the computer via a computer readable storage medium that records the program.

In accordance with the invention, the image forming apparatus which restricts an unauthorized copy of a printed material with a two dimensional code printed thereon can restrict copying at the time when an image is formed from image data obtained by scanning the printed material or at the time when the stored image data are browsed on an external device. Therefore, restraining performance to an unauthorized copy of an important document can be improved.

Further features of the present invention will become apparent from the following description of exemplary embodiments (with reference to the attached drawings).

BRIEF DESCRIPTION OF THE DRAWINGS

FIG. 10 is a view for explaining the difference between data sizes of the first and second information;

DESCRIPTION OF THE EMBODIMENTS

First, an embodiment of the invention is described in detail with reference to the accompanying drawings.

(Image Forming System)

Figure 1:
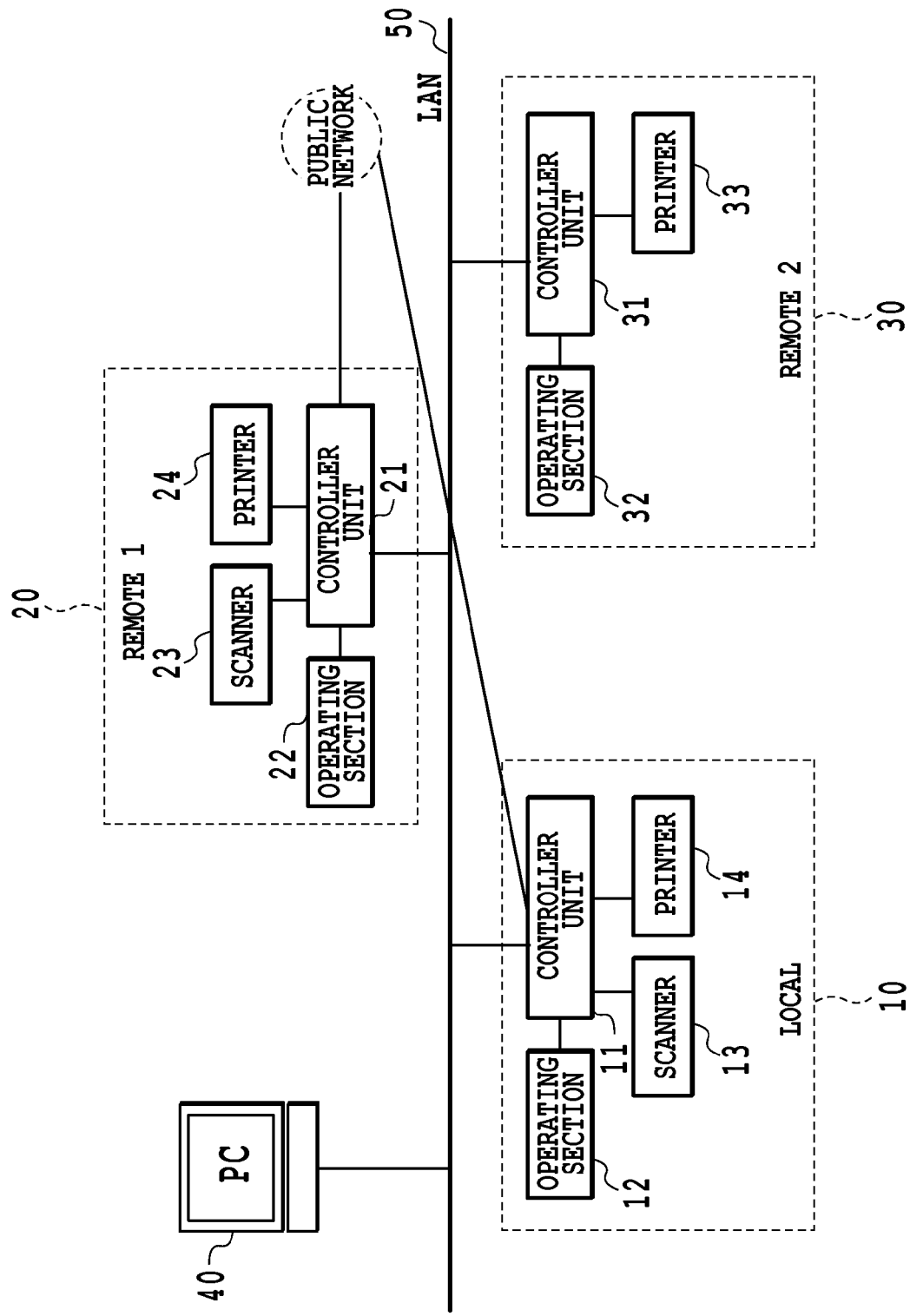
FIG. 1 is a block diagram showing a configuration of an image forming system of an embodiment of the present invention.

FIG. 1 is a block diagram showing a configuration of an image forming system of an embodiment of the present invention In an image forming system of this embodiment shown in FIG. 1, a host computer 40 and three image forming apparatuses (10, 20, 30) are connected to a LAN 50. However, in implementing the invention, the number of connections thereof is not necessarily limited to the above. Further, although the LAN is applied to this embodiment as a connection method, the connection is not limited to the LAN. For example, it is also possible to apply this embodiment to an arbitrary network such as a WAN (public network), a serial transmission system such as a USB, a parallel transmission system such as Centronics interface or SCSI, and the like.

The host computer (hereinafter referred to as a PC) 40 includes functions of a personal computer. This PC 40 can transmit and receive files and e-mails using FTP and SMB protocols via a LAN 50 and a WAN. In addition, the PC 40 can issue a print command to the image forming apparatuses 10, 20, and 30 via a printer driver. Moreover, the PC 40 can display image data stored in the image forming apparatus on a monitor of the PC 40.

The image forming apparatuses 10 and 20 have the same configuration. The image forming apparatus 30 includes only a print function, but does not include a scanner, which each of the image forming apparatuses 10 and 20 includes. For the sake of simplicity, of the image forming apparatuses 10 and 20, attention is given to the image forming apparatus 10, a configuration of which is described in detail below.

(Image Forming Apparatus 10)

The image forming apparatus 10 includes a scanner section 13 as an image input device, a printer section 14 as an image output device, a controller 11 for performing operation control on the entire image forming apparatus 10, and an operating section 12 as a user interface (UI). The scanner section 13 inputs reflected light obtained by exposing and scanning an image on an original document into a CCD so as to convert information of the image into an electrical signal. The scanner section 13, further, converts the electrical signal into a luminance signal consisting of the R, G, and B colors, and outputs the luminance signal to the controller 11 as image data. The printer section 14 is an image forming device which forms the image data received from the controller 11 on a sheet of paper. Incidentally, as an image forming system in this embodiment, for example, the following methods can be employed: an electrophotographic system which uses a photoconductive drum or a photoconductive belt, or an ink-jet system which expels inks from a minute nozzle array to print on a sheet of paper. However, the image forming system is not limited to these systems.

(Controller 11)

Next, a detailed configuration of the controller 11 of the image forming apparatus 10 is described with reference to FIG. 2.

Figure 2:
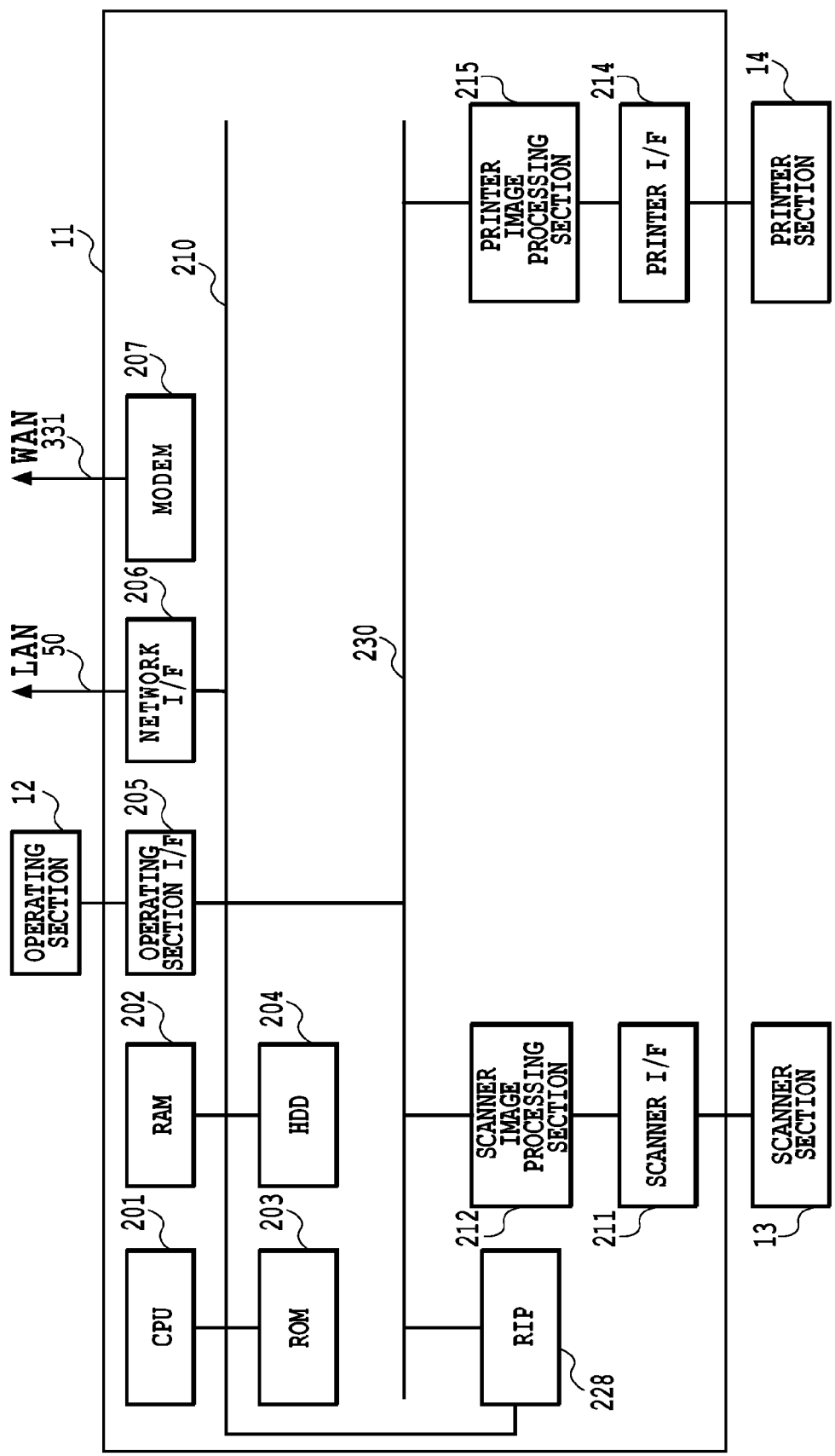
FIG. 2 is a block diagram showing a configuration of a controller 11 of an image forming apparatus 10 in an embodiment of the present invention.

FIG. 2 is a block diagram showing a configuration of the controller 11 of the image forming apparatus 10.

The controller 11 is electrically connected to the scanner section 13 and the printer section 14, and meanwhile, it is also connected to the PC 40 or an external device via the LAN 50 or a WAN 331. This enables image data and device information to be inputted and outputted.

A CPU 201 achieves centralized control of access to individual devices connected thereto according to control programs and the like stored in a ROM 203, and centralized control of various processing operations carried out inside the controller 11. A RAM 202 is a system work memory for the operation of the CPU 201 and is also a memory for temporarily storing image data. This RAM 202 includes a nonvolatile SRAM in which stored contents are retained even after a power off and a DRAM in which stored contents are erased after a power off. In the ROM 203, a boot program and the like for the apparatus are stored. An HDD 204 is a hard disk drive, and is capable of storing therein system software and image data.

An operating section I/F 205 is an interface section which connects a system bus 210 and an operating section 12. The operating section I/F 205 receives image data to be displayed on the operating section 12 from the system bus 210, and outputs the image data to the operating section 12. In addition, the operating section I/F 205 outputs information inputted from the operating section 12 to the system bus 210.

A network I/F 206 is connected to the LAN 50 and the system bus 210 to enable information to be inputted and outputted through the network I/F 206. A modem 207 is connected to a WAN 331 and the system bus 210 to enable information to be inputted and outputted through the modem 207. An image bus 230 is a transmission line for transmitting and receiving image data, and consists of a PCI bus or IEEE 1394.

A scanner image processing section 212 detects whether or not there is a two dimensional code on image data received from the scanner section 13 via a scanner I/F 211, and if a two dimensional code is detected, the scanner image processing section 212, as a password obtaining means, decodes the two dimensional code to obtain a password. The CPU 201 as a storing control means associates the decoding result with the image data received from the scanner section 13, and stores the decoding result in the RAM 202 or in the HDD 204. In addition, the CPU 201 encodes predetermined information inputted from a virtual keyboard or the like of the operating section 12 so as to generate a two dimensional code, and can compose the generated two dimensional code with the image data stored in the RAM 202 or in the HDD 204. The predetermined information includes, for example, a device number, printing time information, user ID information, password information, or the like. Incidentally, a digital watermarking technology having a resistance property to a print medium has been developed. Thus, in order to obtain an image (encoded image) that consists of the above encoded predetermined information, a digital watermarking image generated by use of such a digital watermarking technology, instead of a two dimensional code, can also be used.

A printer image processing section 215 receives image data from the image bus 230, and outputs the image data to the printer section 14 via the printer I/F 214.

An RIP 228 receives intermediate data which are generated from PDL code data transmitted from the PC 40 and the like, and generates image data. The CPU 201 stores the image data received from the RIP 228 in the RAM 202 or in the HDD 204.

(Input Processing of Image Data)

Described herein is a processing at the time when inputting image data of a printed material (an original document) on which a two dimensional code is printed.

Figure 3:
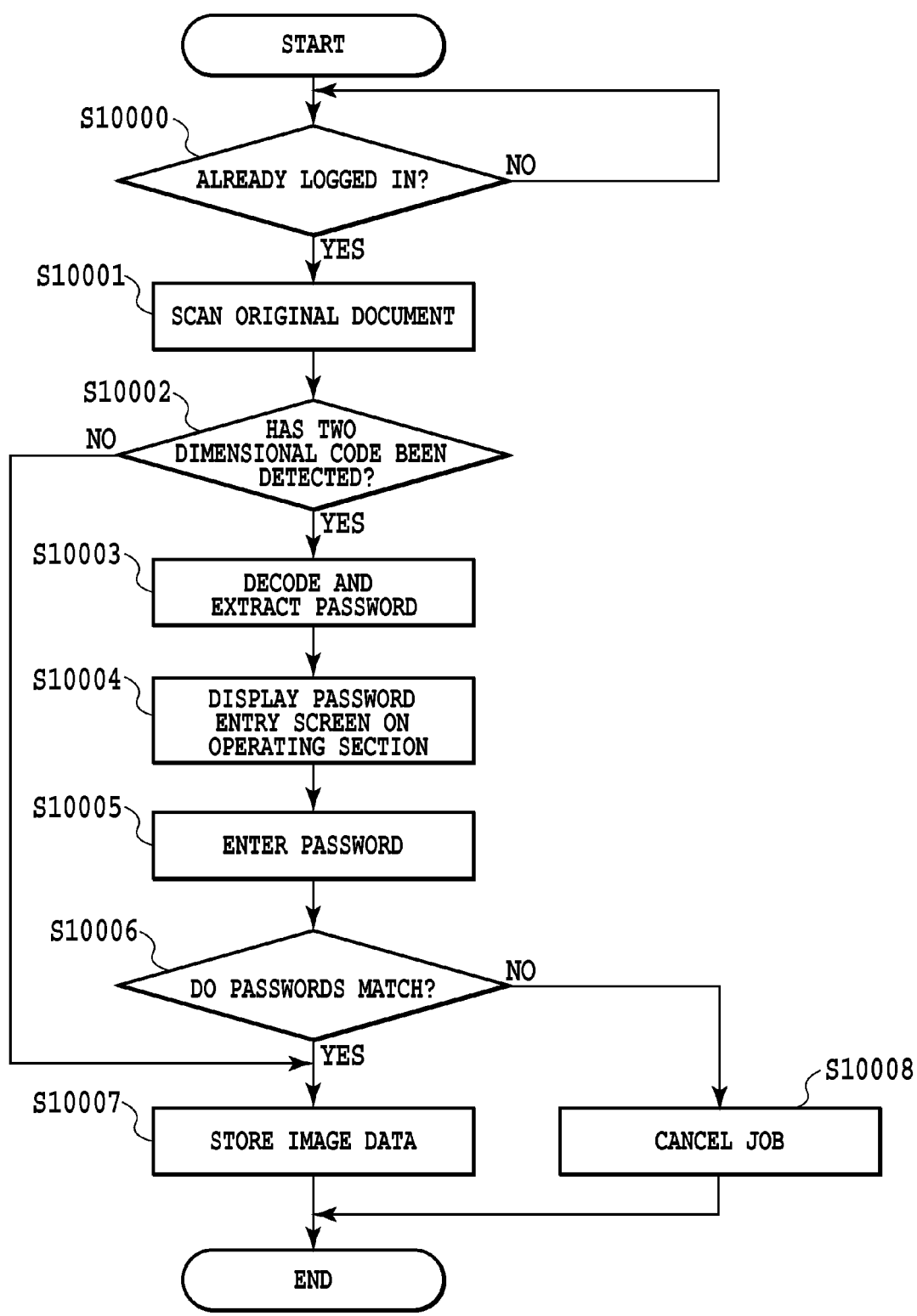
FIG. 3 is a flowchart showing a processing, in an embodiment of the present invention, at the time when inputting image data of a printed material (an original document) with a two dimensional code printed thereon.

FIG. 3 is a flowchart for explaining a processing of this embodiment at the time when inputting image data of a printed material (an original document) on which a two dimensional code is printed.

First, in S10000, the CPU 201 determines whether or not a user intending to make an input has logged in to an image forming apparatus. After logging in to the image forming apparatus, the user can use various functions included in the image forming apparatus. At the login, a user's login password is inputted. At this time, a login screen (not shown) is displayed on the operating section 12 by the CPU 201. When receiving a login password inputted by the user, the CPU 201 compares the inputted login password with a pre-registered login password stored in the HDD 204.

If the login password inputted by the user matches the pre-registered login password, the CPU 201 stores, in the HDD 204, login state information indicating that the user has logged in to the image forming apparatus. Referring to this login state information, the CPU 201 determines whether or not the user has logged in. If the user has logged in, the processing proceeds to S10001.

In S10001, the CPU 201 controls a transmission of image data scanned with the scanner section 13 to the scanner image processing section 212 via the scanner I/F 211.

In S10002, the scanner image processing section 212 detects whether or not the image data include a two dimensional code thereon. Incidentally, a two dimensional code used in this embodiment is not limited to a specific code. For the two dimensional code, for example, a QR code, or an encoding code referred to as an LVBC (Low Visibility Barcode) invented by the applicant of the present invention can be used. Details of this LVBC are described later. However, when a password is obtained from a two dimensional code, such as a QR code, disposed on a portion of an image, the password is not set to the entire image. The reason why this is done is that a two dimensional code, such as a QR code, disposed on a portion of the image can easily be cut out, which means that it does not have capability to protect the entire image right from the start. Therefore, a password included in the two dimensional code, such as a QR code, disposed on a portion of the image is considered to be one for another use, so that the password is not set to the entire image.

If detecting the two dimensional code in S10002, the CPU 201 decodes the detected two dimensional code, and stores obtained password information in the RAM 202 in S10003. Further, the processing proceeds to S10004, and the CPU 201 displays, on the operating section 12, a password entry screen as shown in FIG. 6.

Next, in S10005, the CPU 201 receives a password inputted by the user through a virtual keyboard window 602 (FIG. 6) of the operating section 12, and stores the password in the RAM 202.

Subsequently, in S10006, the CPU 201 determines whether or not the password obtained by decoding the two dimensional code matches the password transmitted from the operating section and received by the CPU 201. If the two passwords match each other, the processing proceeds to S10007 and image data including the two dimensional code are stored in the HDD 204 so that the image data are associated with the password. Also, if the two dimensional code is not detected in S10002, the processing proceeds to S10007. In this case, an input is a normal one without a copy restriction with use of a two dimensional code, and inputted image data are stored in the HDD 204.

Figure 6:
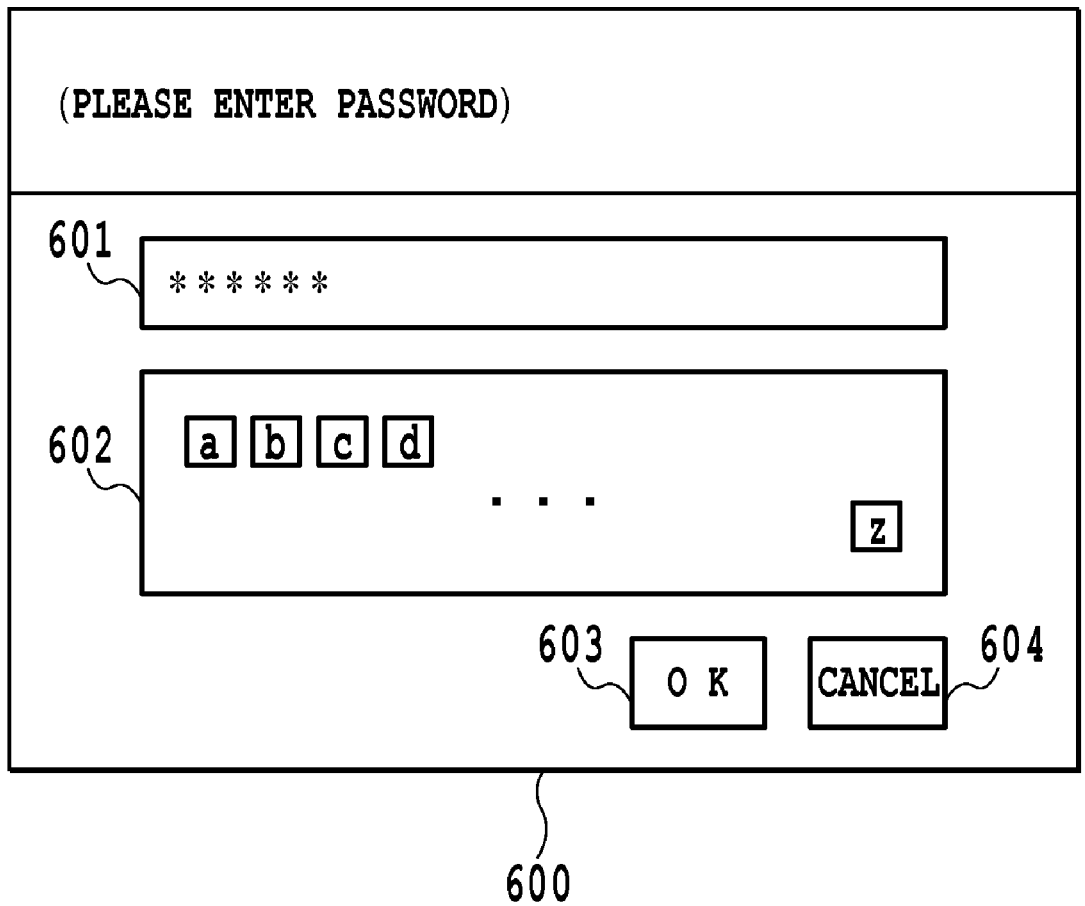
FIG. 6 is a view showing an example of a password entry screen in an embodiment of the present invention.

Meanwhile, if the passwords do not match each other in S10006 or if a cancel key 604 shown in FIG. 6 is pressed down, the processing proceeds to S10008, and the CPU 201 cancels the job and abandons the image data.

(Output Processing of Image Data)

Next, described is a processing operation at the time when outputting image data including a two dimensional code stored in the HDD 204.

Figure 4:
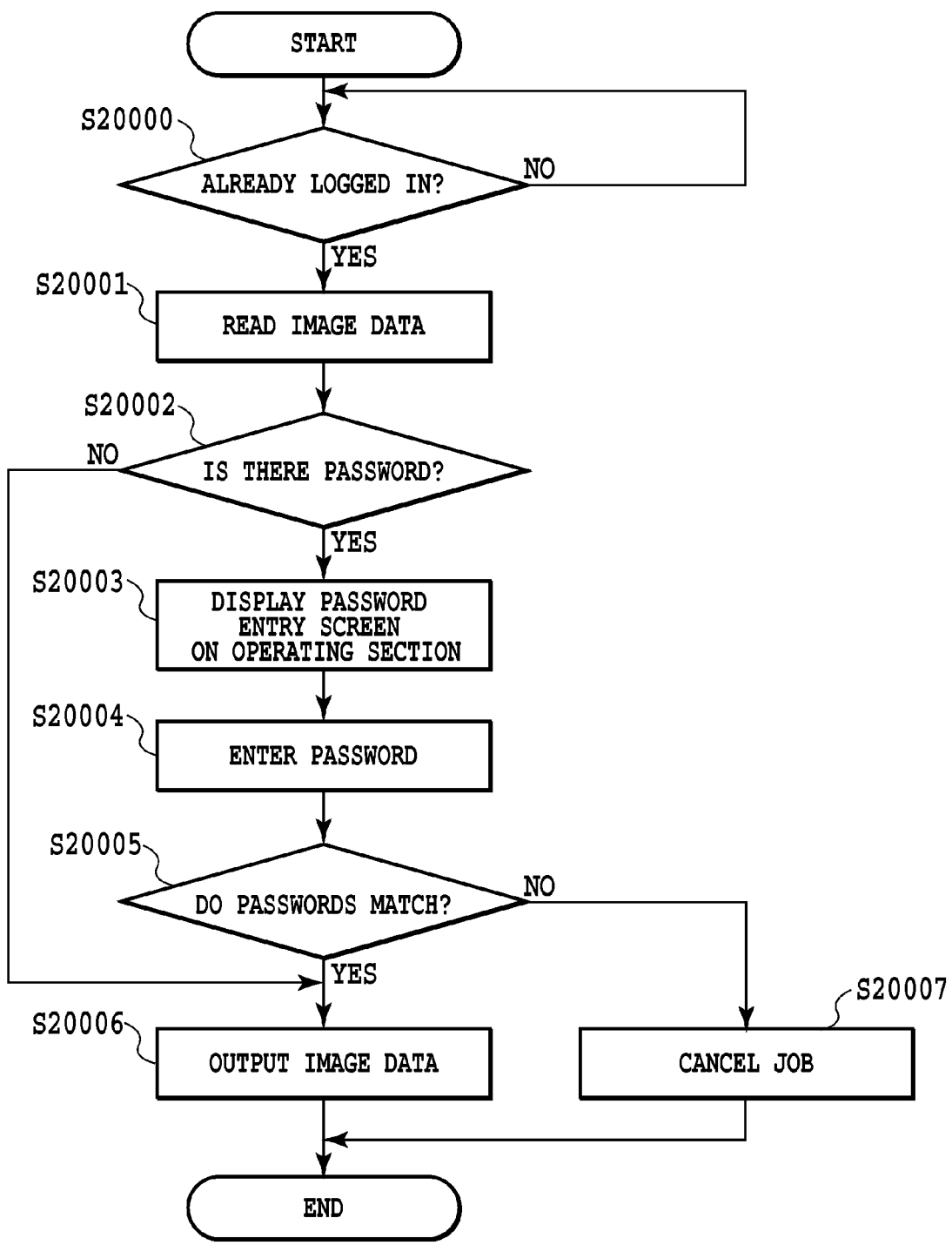
FIG. 4 is a flowchart for explaining a processing, in an embodiment of the present invention, at the time when image data including a two dimensional code stored in an HDD 204 is outputted.

FIG. 4 is a flowchart for explaining a processing of this embodiment at the time when outputting image data including a two dimensional code stored in an HDD 204.

First, in S20000, the CPU 201 determines whether or not a user intending to make an output of image data has logged in to the image forming apparatus. After logging in to the image forming apparatus, the user can use various functions included in the image forming apparatus. At the login, a user's login password is inputted. At this time, a login screen (not shown) is displayed on the operating section 12 by the CPU 201. When receiving a login password inputted by the user, the CPU 201 compares the inputted login password with a pre-registered login password stored in the HDD 204.

If the login password inputted by the user matches the pre-registered login password, the CPU 201 stores, in the HDD 204, login state information indicating that the user has logged in to the image forming apparatus. Referring to this login state information, the CPU 201 determines whether or not the user has logged in. If the user has logged in, the processing proceeds to S20001.

When an output of image data stored in the HDD 204 is instructed by the user through the operating section 12, in S20001 the CPU 201 reads the image data stored in the HDD 204 into the RAM 202.

Next, in S20002, the CPU 201 determines whether or not a password is associated with the above image data. If the password is associated therewith, the processing proceeds to S20003 and the CPU 201 displays the password entry screen shown in FIG. 6 on the operating section 12. As described above, if a password has been obtained from a two dimensional code within an image and if an instruction is issued by the user so that the above image data stored in the HDD 204 are outputted, control is performed so that the user is requested to input the password obtained from the two dimensional code.

In addition, in S20004, the CPU 201 receives a password inputted by the user through the virtual keyboard window 602 of the operating section 12, and stores the password in RAM 202.

Next, in S20005, the CPU 201 determines whether or not the password (a password obtained by decoding a two dimensional code within the image data) associated with the image data matches the password received from the operating section. If these passwords match each other, the processing proceeds to S20006 so that output of the image data is made. The output of the image data herein represents printing at the printer section 14, a Fax transmission, a file transfer to an external device, or the like.

If the password is not associated with the image data in S20002, a copy restriction is not involved, and thus the processing proceeds to S20006 so that output of the image data is made. Incidentally, if the passwords do not match each other or if the cancel key 604 is pressed in FIG. 6, the processing proceeds to S20007 and the CPU 201 cancels the job.

(Preview Processing of Image Data)

A preview processing of image data is herein described with reference to FIG. 5.

Figure 5:
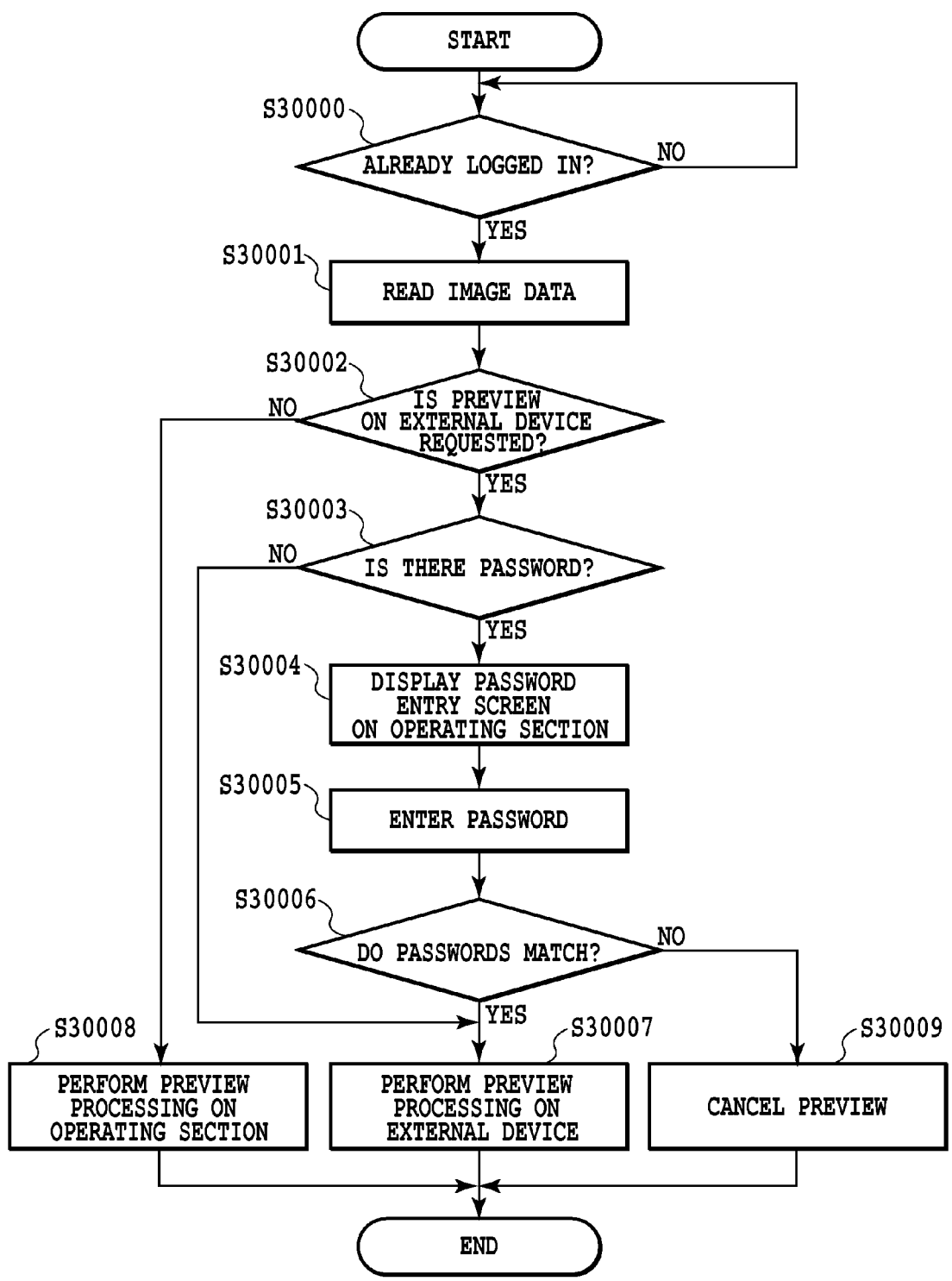
FIG. 5 is a flowchart for explaining a processing for a preview in an embodiment of the present invention.

FIG. 5 is a flowchart for explaining a processing for a preview in this embodiment.

First, in S30000, the CPU 201 determines whether or not a user intending to preview image data has logged in to an image forming apparatus. Since this determination processing is the same as those in "Input Processing of Image Data" and "Output Processing of Image Data" described above, a detailed description thereof is omitted. In S30000, if the CPU determines that the user has logged in, the processing proceeds to S30001.

In S30001, the CPU 201 reads image data stored in the HDD 204 into the RAM 202.

Next, in S30002, the CPU 201 determines which mode is in use between a mode in which a preview is displayed on the operating section 12 and a mode in which a preview is displayed on a display section of an external device such as the PC 40. If a preview display instruction is made by the user through the operating section 12, it is determined that the mode is one in which a preview is displayed on the operating section 12. If the mode is one in which a preview is displayed on the operating section 12, the processing proceeds to S30008, and the CPU 201 performs control so that image data are displayed on the operating section 12. As described above, if the user issues an instruction so that image data stored in the HDD 204 are displayed on the operating section 12, even if a password is obtained from a two dimensional code, the user is not requested to input this password. Incidentally, in this embodiment, it is assumed that the operating section 12 does not have a print screen function for handling an image displayed on the operating section 12 as other file.

Meanwhile, if a preview display instruction (e.g., a display instruction from the side of an external device by an HTTP access) is made by the user through an external device, it is determined that the mode is one in which a preview is displayed on a display section of an external device. As just described, if the mode is one in which a preview is displayed on a display section of an external device other than a display means of the image forming apparatus, the processing proceeds to S30003 and the CPU 201 determines whether or not a password is associated with the image data.

If a password is associated with the image data, the processing proceeds to S30004 and the CPU 201 displays the password entry screen as shown in FIG. 6 on the operating section 12. That is, the user is requested to input the password obtained in S10002 and S10003.

Thereafter, in S30005, the CPU 201 receives the password inputted by the user through the virtual keyboard window 602 of the operating section 12, and stores the password in the RAM 202.

Next, in S30006, the CPU 201 determines whether or not the password (a password obtained by decoding the two dimensional code within the image data) associated with the image data matches the password received from the operating section 12. If these passwords match each other, the processing proceeds to S30007, and control is performed so that the image data are displayed on a display section of the external device. As just described, if an instruction is given by the user to display the image data stored in the HDD 204 on a display section of the external device, control is performed so that the user is requested to input the password obtained from the two dimensional code.

Meanwhile, in S30003, if the password is not associated with the image data, a copy restriction is not involved, and thus the processing proceeds to S30007, and control is performed so that the image data are displayed on a display section of the external device. In addition, in S30006, if the passwords do not match each other or if the cancel key 604 is pressed in FIG. 6, the processing proceeds to S30009, and the CPU 201 cancels the job.

(Password Entry Screen 600)

The password entry screen 600 is described briefly below.

FIG. 6 shows the password entry screen 600 displayed on the operating section 12 in S10004, S20003, and S30004.

Characters of a password which are entered by the user through the virtual keyboard 602 (character keys are not shown in the figure) are displayed in "*" in a display field for password input result 601. If an OK key 603 is pressed, the CPU 201 receives the entered password character string via an operating section I/F 205, and stores the password character string in the RAM 202. If the cancel key 604 is pressed, the CPU 201 cancels the job.

(Details of LVBC)

Next, details of the LVBC which is a type of two dimensional code are described.

The LVBC has the following features.

(1) To allow a sufficient amount of information to be embedded in a sheet of paper.

(2) To enable extraction, as digital information, of information embedded in the paper with use of a color material.

(3) To be resistant to a factor disturbing the extraction of information at the time of copying the original document, the factor being represented by a rotation, an enlargement, a reduction, a partial deletion of an original document, a dim or blurred signal caused by copying, and a blot on an original document, and the like.

(4) To shorten a period of time during which information is extracted from the paper.

Incidentally, the above-described items (1) and (4) are generally contradictory to each other, and if an amount of embedding information is increased, a time required for extracting information becomes long.

Figure 7:
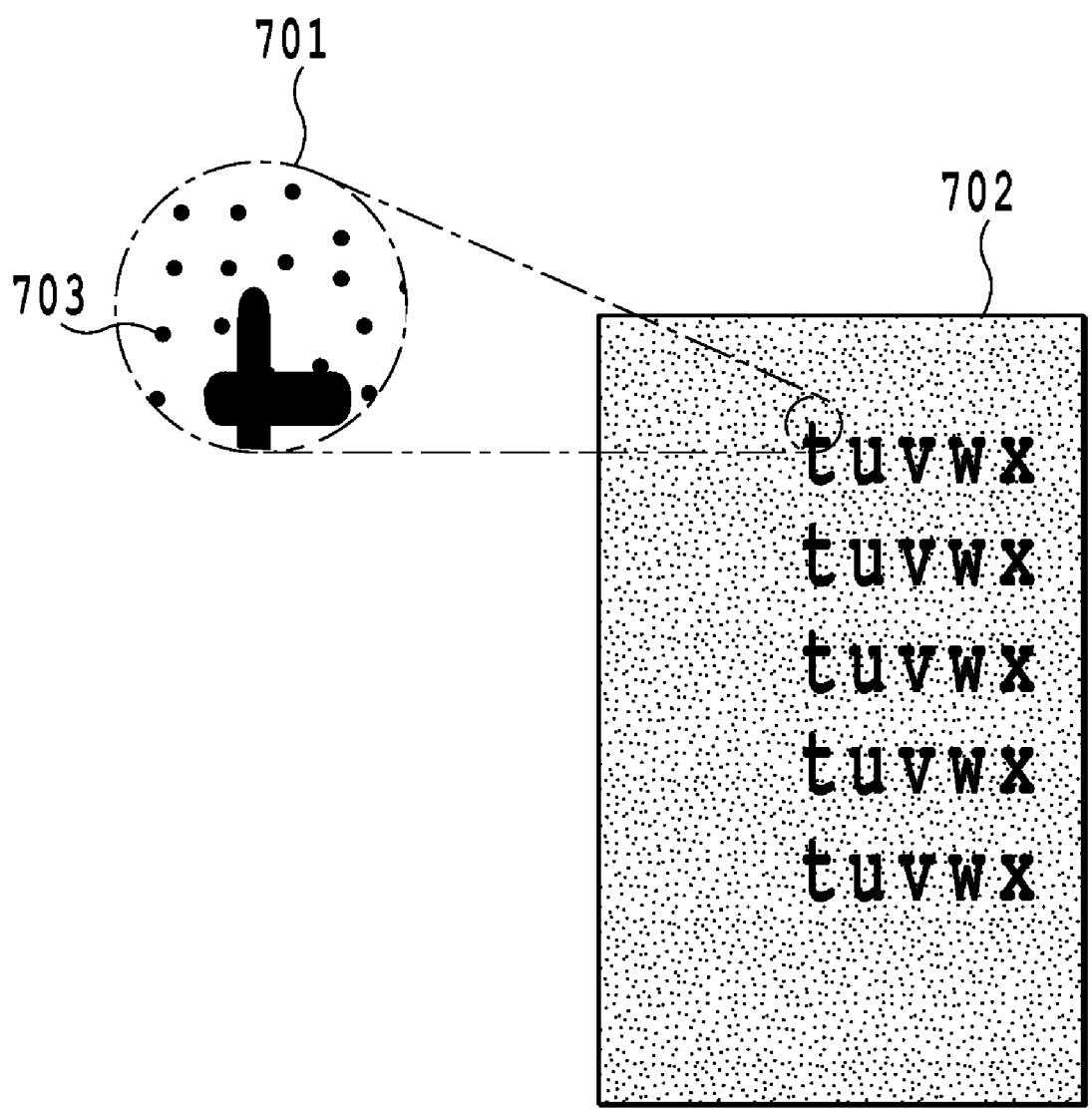
FIG. 7 is a view representing a printed output including a background image in an embodiment of the present invention.

FIG. 7 is a view representing, as an example, an appearance of a printed output including a background image.

In FIG. 7, reference numeral 702 denotes the entire printed output on which the characters "t", "u", "v", "w", "x" are printed, and reference numeral 701 denotes an enlarged view of a part of the printed output 702. As seen from the enlarged view 701, a background image 703 and a part of a character (a part of the character "t") is printed on the part of the printed output, where the background image 703 is composed of a group of dots. That is, additional information is embedded in the printed output in the form of the group of dots. This group of dots represents the LVBC.

Figure 8:
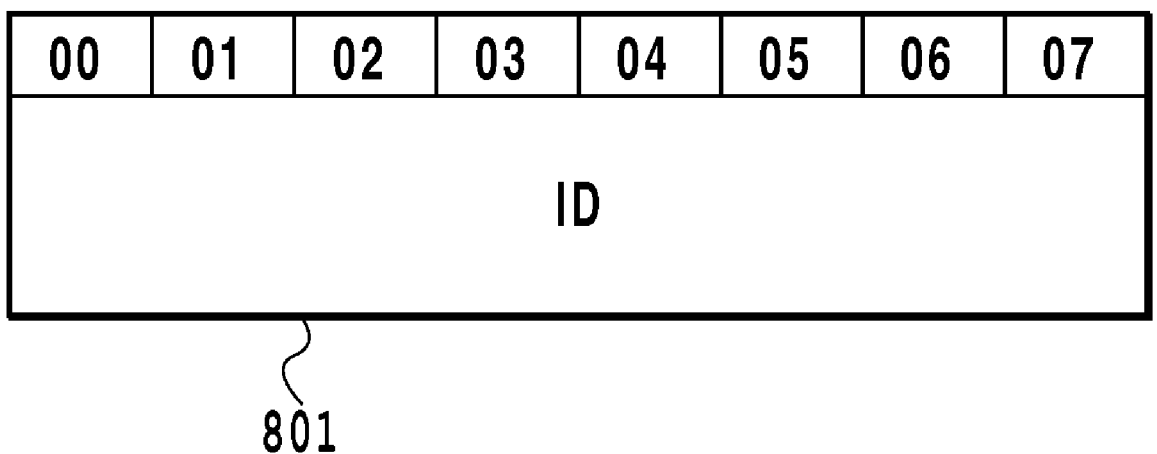
FIG. 8 is a view showing an example of first information included in an LVBC.
Figure 9:
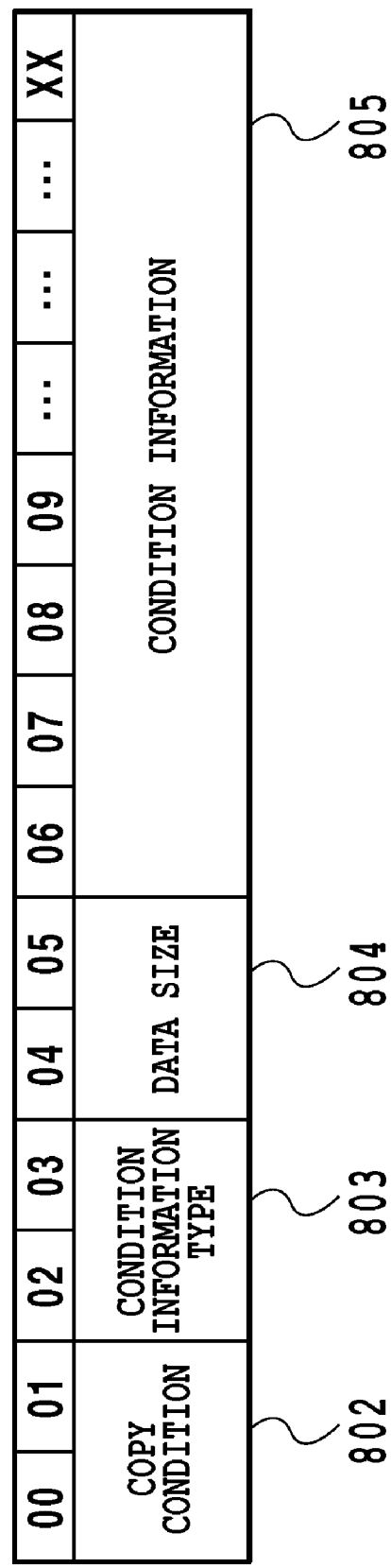
FIG. 9 is a view showing an example of second information included in an LVBC.

FIGS. 8 and 9 are views showing additional information included in the LVBC. The additional information includes first information (e.g., identification information (ID) set for every print job) and second information (e.g., copy control information). The first information and the second information are embedded in a first region and a second region, respectively, which are described later. FIG. 8 shows the first information, and FIG. 9 shows the second information. In accordance with FIG. 9, the copy control information includes a 2-byte copy condition 802, a 2-byte condition information type 803, a 2-byte data size 804, and predetermined number-of-bytes condition information (authentication information) 805. The copy condition includes those representing "allowance of a copy," "inhibition of a copy," "designation of a condition for allowing a copy," and the like. The condition information represents a password, a username, and the like. The condition information type represents a type of condition information. The data size represents a data size of the condition information.

Use of the LVBC enables a composed information, which is obtained by composing the above first and second information, to be embedded in an image as additional information. Further, use of the LVBC enables a selection of either one of an extraction of first information only, an extraction of second information only, and an extraction of first and second information, depending on an application. In addition, the contents of the additional information can also arbitrarily be changed depending on the application.

An embedding method of embedding additional information and an extraction method thereof using the LVBC are described below.

A region in which first information is embedded is a first region, and a region in which second information is embedded is a second region. As shown in FIG. 10, the data size of the first information is small, and the data size of the second information is large. In addition, as described above, when a copier detects, at the time of copying, that there is first information, the first information is certainly extracted. In contrast, even when a copier detects that there is second information, the second information may be not extracted in some cases.

Figure 11:
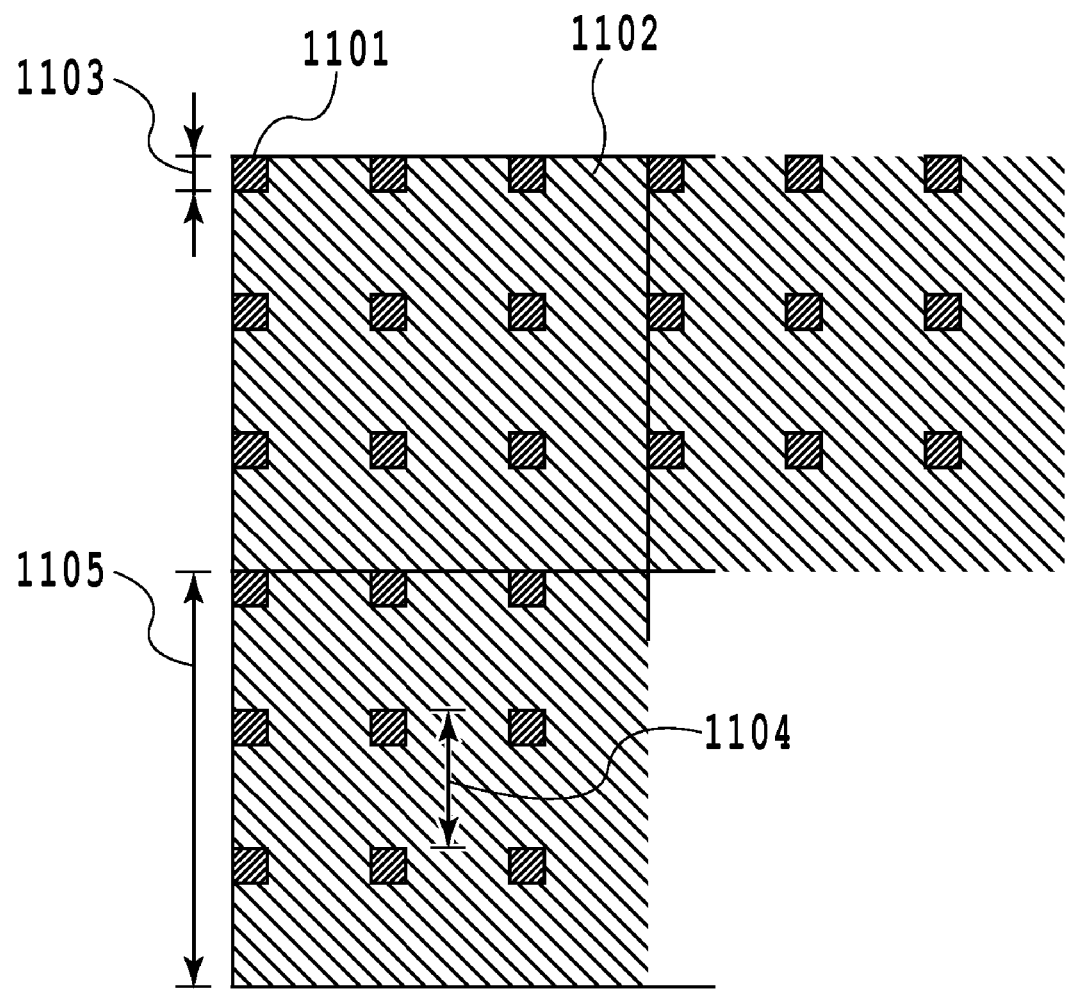
FIG. 11 is a view showing a state in which information is embedded in an image with use of the LVBC, and also showing the dispositions of a first region and a second region.

FIG. 11 shows a state in which information is embedded in an image with use of the LVBC, and also shows the dispositions of a first region and a second region.

A quadrangular region denoted by 1101 represents a first region. There are a plurality of first regions 1101 which are respectively embedded in an image in a repetitive manner at fixed intervals. The same data are embedded in all the first regions 1101. The reason why the plurality of first regions 1101 are disposed is to increase redundancy so as to improve resistance to noise and errors.

A region denoted by 1102 represents a second region. There are also a plurality of second regions. The second region 1102 is a region other than the first regions 1101, so that both regions do not overlap each other. 1103 denotes the size of the first region, 1104 denotes the length of the repetition interval of the first region, and 1105 denotes the size of the second region.

Described next is an embedding method in which, with use of the LVBC, additional information is embedded in original document image data in the form of dots. In the LVBC, a group of dots (1201 in FIG. 12) with a grid serving as a reference are embedded in original document image data.

Figure 12:
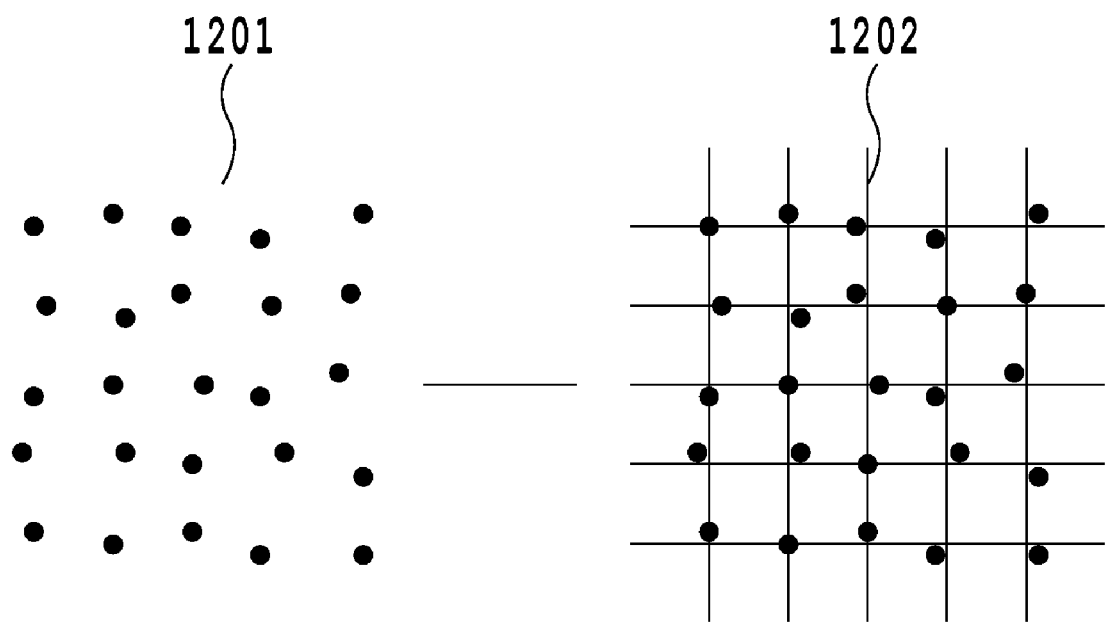
FIG. 12 is a view for explaining a grid of a group of dots in the LVBC.

In FIG. 12, 1202 denotes a grid. Incidentally, the grid is a virtual grid and, thus, does not actually exist on a sheet of paper.

Additional information is inputted as binary data within a certain size. The additional information is embedded in the original document image data in such a way that dots disposed on intersections of a grid are displaced (misaligned from the intersections) in any one of eight directions at the intersections.

Figure 13:
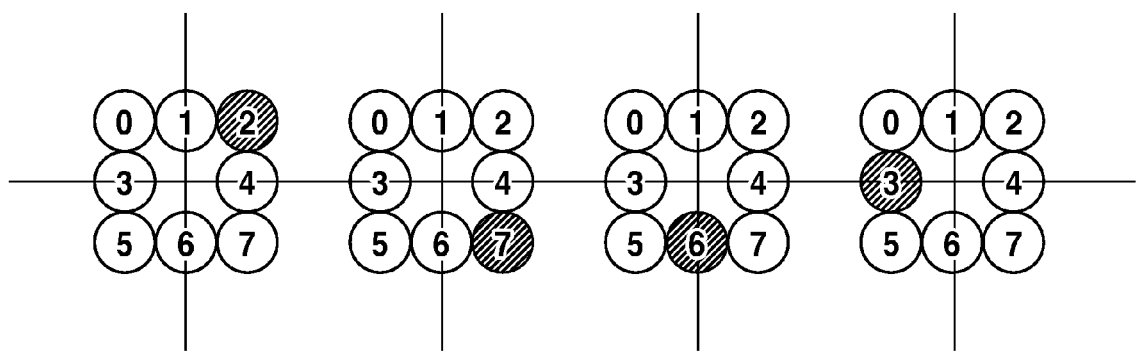
FIG. 13 is a view showing that dots displaced from a grid represent data in the LVBC.

FIG. 13 is a view showing a method in which binary data represented by 010111110011b are embedded as additional information. The decomposing of 010111110011b into 3 bits each gives 010, 111, 110, 011. Further, the performing of a binary to decimal conversion on each 3 bits gives 2, 7, 6, 3. As shown in FIG. 13, additional information is embedded with each grid dot displaced in a direction corresponding to a numeric value. For example, when the additional information of 2, 7, 6, 3 are embedded in original document image data in the form of dots, the respective dots are moved to the upper right (position at "2") of the intersection, the lower right (position at "7") thereof, below (position at "6") the intersection, and the left (position at "3") thereof. This process is repetitively performed on the entire image. In this manner, additional information can be embedded in original document image data in a dot pattern. In addition, the same groups of dots are embedded repetitively on a plurality of positions of the original document image data, so that even when there are dirt, a wrinkle, or a partial breakage, the false recognition rate of reading of additional information can be reduced.

On the analysis of the LVBC, it is necessary to correctly figure out the position of a grid. Therefore, it is desired that the displaced dots appear on an equal probability in the eight directions. However, when specific data (e.g., 0) are embedded, as can be seen from the dots which are displaced equally to the upper left (position at "0") of the intersections, the dots do not appear in the eight directions with an equal probability. Hence, a scramble process (e.g., a symmetric key cryptography process) having reversibility is performed on embedded information, whereby the displacements of the dots can be randomized.

Further, a grid with the minimum possible size to express additional information is generated as a tile pattern, and at the time of actual printing, the tile pattern can be pasted repetitively on a sheet of paper.

Incidentally, the embedding of additional information using the LVBC is, so to speak, a method in which additional information in the form of digital data is converted into analog data to be thereafter printed on the paper, so that the method can be achieved with a comparatively simple scheme.

Next, referring to the drawing, described is a processing operation in which an embedded information extraction section 1400 included in the scanner image processing section 212 of the controller 11 extracts additional information from original document image data.

Figure 14:
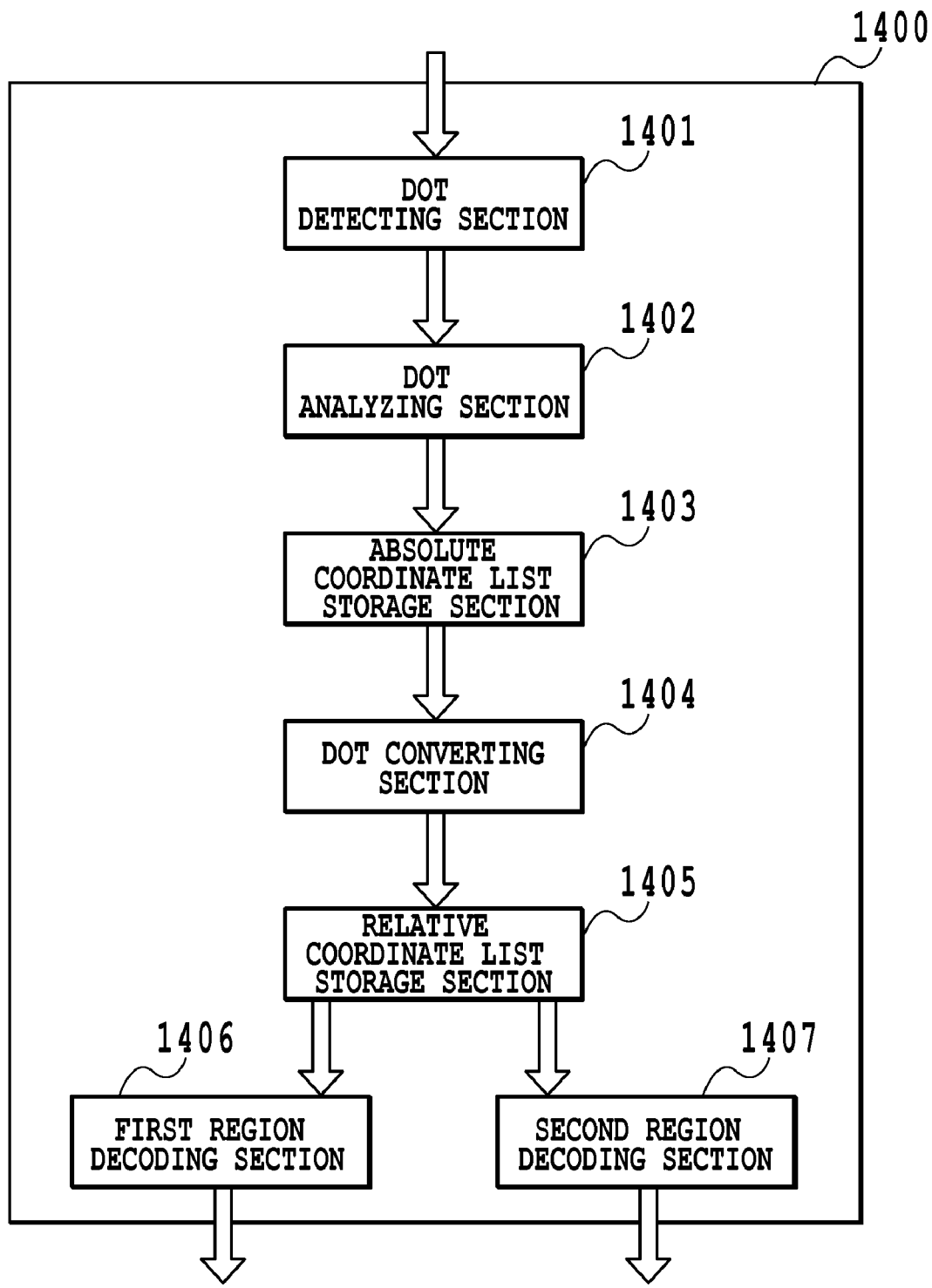
FIG. 14 is a block diagram showing a configuration example of an embedding information extraction section in an embodiment of the present invention.

FIG. 14 is a block diagram showing a configuration example of the embedded information extraction section 1400 which analyzes the LVBC.

The embedded information extraction section 1400 includes a DOT DETECTING SECTION 1401, a dot analyzing section 1402, an absolute coordinate list storage section 1403, a dot converting section 1404, a relative coordinate list storage section 1405, a first region decoding section 1406, and a second region decoding section 1407.

The dot detecting section 1401 extracts a plurality of dots from original document image data in which additional information is embedded, and converts the plurality of dots into coordinate information. The dot analyzing section 1402 removes unnecessary dots consisting of halftone dots from the plurality of dots extracted by the dot detecting section 1401. The absolute coordinate list storage section 1403 stores, as a list, absolute coordinates of the plurality of dots analyzed by the dot analyzing section 1402. The dot converting section 1404 detects rotation angles and grid intervals from the list of the absolute coordinates, which is stored in the absolute coordinate list storage section 1403, and converts the rotation angles and grid intervals into relative coordinates from grid positions. The relative coordinate list storage section 1405 stores the relative coordinates outputted from the dot converting section 1404. The first region decoding section 1406 extracts first information from a first region as additional information, and outputs an extraction result. The second region decoding section 1407, only when necessary, extracts second information from a second region as additional information and outputs an extraction result.

The above-described processings are specifically described.

The dot detecting section 1401 receives a signal of an image read by an optical scanner in the form of multiple-valued monochrome image data. The embedding of additional information with use of the LVBC is made in the form of a group of dots of monochrome binary image data as shown in FIG. 7. However, influenced by the degree of toner deposited at the time of embedding, the handling of paper, the optical system at the time of scanning, or the like, the received signal can become weak and blurred. Therefore, to eliminate such influences, isolated points on the image are checked with use of received original document image data, so that the dots are detected, and the position of the center of gravity of the detected dots are recognized as a coordinate position so as to improve the accuracy of extraction. In addition, the dot detecting section 1401 measures the particle sizes of dots and the density thereof. Absolute coordinates, particle sizes, and densities of all the dots calculated by the dot detecting section 1401 are transmitted to the dot analyzing section 1402.

The dot analyzing section 1402 removes unnecessary dots extracted by the dot detecting section 1401. Dots detected by the dot detecting section 1401 are desirably and ideally a group of dots of the LVBC, but in practice, they also contain dots for expressing a halftone image the group of which is contained in a printed original document, and isolated points (e.g., a period '.' character) originally contained in an original document. Accordingly, the halftone dots are removed to eliminate these isolated points similar to the group of dots of the LVBC.

Figure 15:
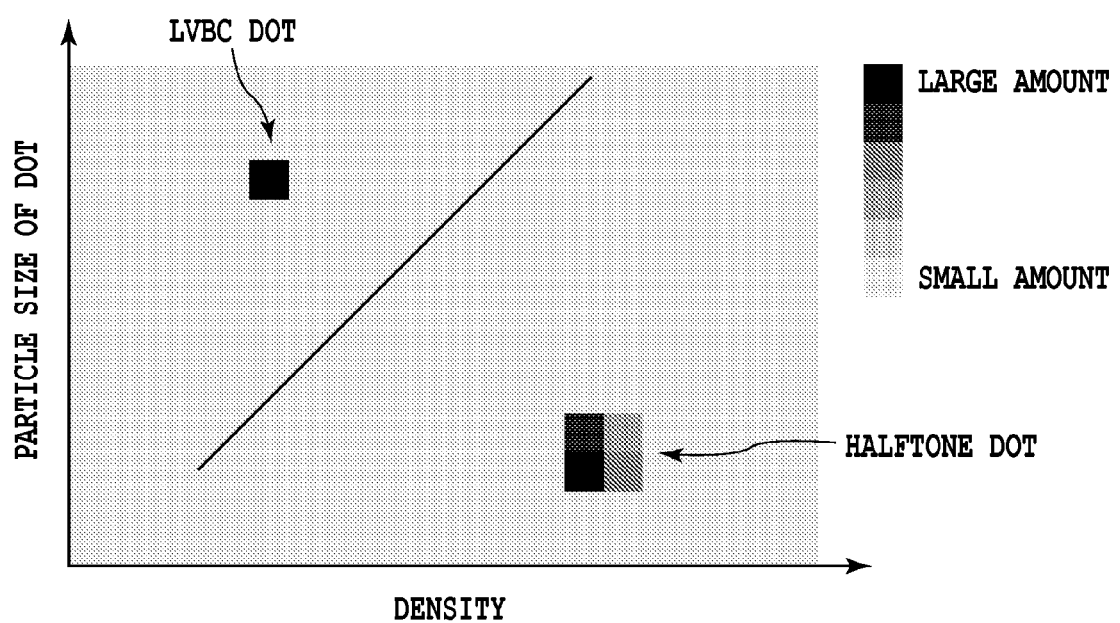
FIG. 15 is a view showing a graph for explaining halftone removal in an embodiment of the present invention.

FIG. 15 shows a graph for explaining an elimination of halftone dots.

A vertical axis of the graph indicates the particle size of dots, and a horizontal axis thereof indicates the density of points. This graph shows a histogram indicating the frequency of appearance of dots with respect to the density of points. This histogram shows that the higher (darker) the density of points, the higher the frequency of appearance of dots. In the case of the group of dots of the LVBC, the particle size and the density of all the dots are made uniform at the time of embedding, so that the frequency of appearance of the group of dots of the LVBC attains its peak on a position within a small range of the graph (e.g., the position of "LVBC dot" of FIG. 15). Meanwhile, in the case of the halftone dots, the particle size and the density are not standardized, dots randomly appear on positions in a wide range of the graph, and the frequency of appearance is comparatively low (e.g., the position of "halftone dot" of FIG. 15). Using this characteristic, dots whose frequency of appearance attains its peak at a position within a small range of the graph are regarded as dots of the LVBC, and the absolute coordinates thereof are stored in the absolute coordinate list storage section 1403, thus eliminating dots other than the above LVBC dots. This processing operation causes only the group of dots of the LVBC to be substantially stored in the absolute coordinate list storage section 1403.

The dot converting section 1404 detects the rotation angle of a grid and grid intervals from the list of absolute coordinates stored in the absolute coordinate list storage section 1403, and the rotation angle of a grid and the grid intervals are converted into relative coordinates from the grid position. A conversion result is stored in the relative coordinate list storage section 1405. An angle of the embedded LVBC dots with respect to a sheet of paper is different from an angle of dots in a scanned image due to a difference of a direction with which the sheet of paper is placed on a scanner or due to a small angle misalignment on an analog level, so that a detection and a correction of the rotation angle need to be made. In addition, since a grid needs to be reproduced to locate information on a position misaligned from a grid position to which a group of dots of the LVBC belongs, it is necessary to correctly determine the intervals of grids.

For each dot, the distance between the dot and a neighboring dot is measured, and a mode value of distances obtained from a histogram of the distances which are measured on the entire image is defined as a grid interval.

Also on the rotation angles of the grid, for all dots, angles with respect to neighboring dots are measured.

Figure 16:
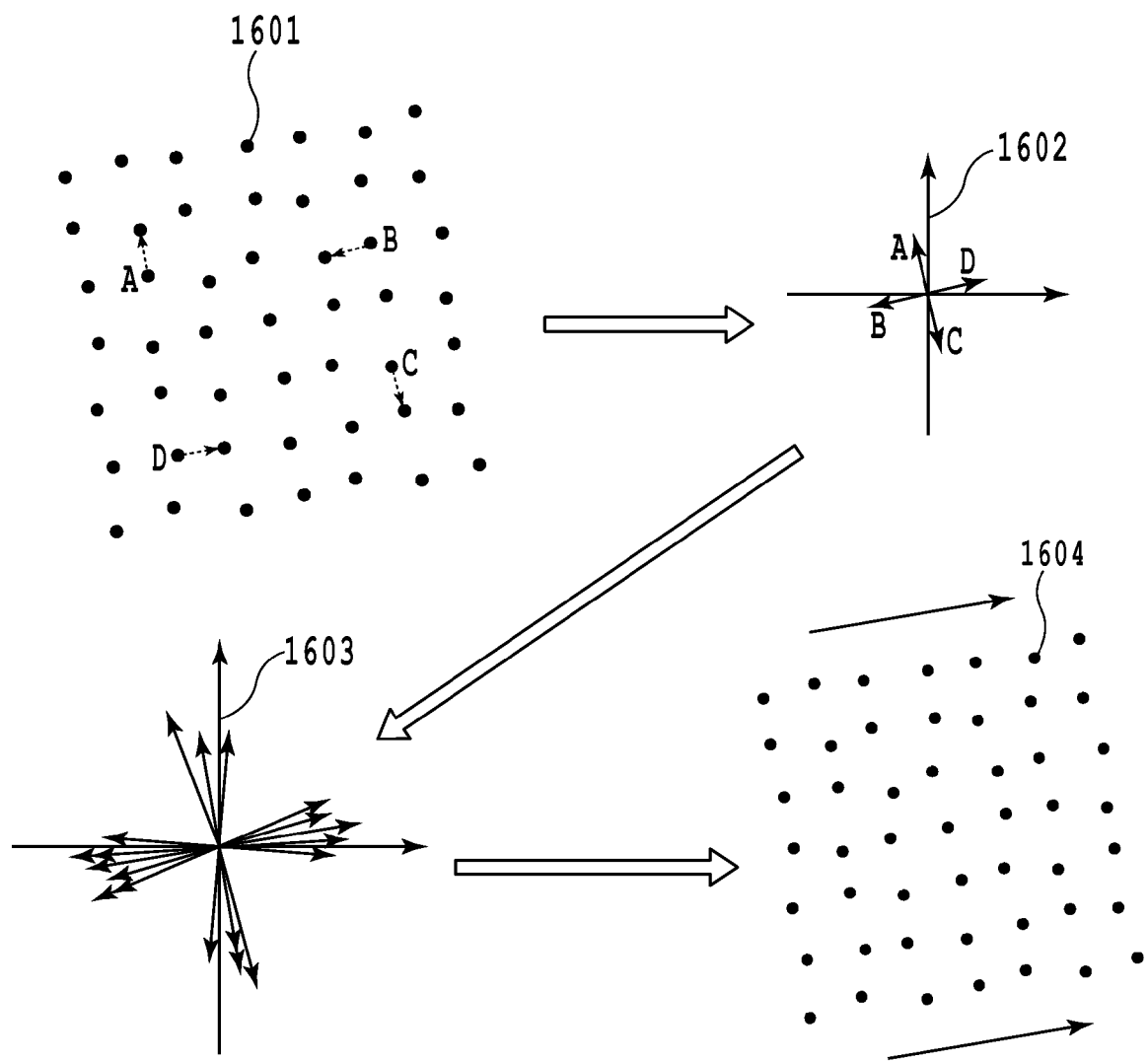
FIG. 16 is a view for explaining a correction of a rotation angle of a grid in an embodiment of the present invention.

FIG. 16 is a view for explaining a correction of rotation angles of a grid.

Fundamentally, the angle of a neighboring dot with respect to a target dot corresponds to either one of the angles 0 degree, 90 degrees, 180 degrees, and 270 degrees, so that by correcting a misalignment of a measured angle, a rotation angle can be determined. An angle θ from the target dot to a neighboring dot is defined below, with a vector (dx, dy) formed by the target dot and the neighboring dot.

$$\theta = a \tan dy/dx$$

1602 of FIG. 16 indicates vectors from dots, A, B, C and D to respective neighboring dots. However, in practice, both the target dots and the neighboring dots are slightly displaced from grid positions for embedding information, so that θ is measured for all target dots. When appearance probabilities of displaced positions of target dots and neighboring dots from grid become equal in the vertical and horizontal directions, misalignments of angles of all target dots are added, so that an average rotation angle of grids can be measured. 1603 denotes vectors for several points, and angles for these points are superimposed, so that a rotation angle of the grid can be approximated. Corrections of rotation angles to be herein obtained are narrowed down in the unit of 90 degrees, but in practice, the angles are not narrowed down to the four angles, 0 degree, 90 degrees, 180 degrees, and 270 degrees. This narrowing down is described in connection with the first region decoding section 1406 to be described later.

Once the grid interval and rotation angles are obtained, a grid with grid intervals is virtually drawn, as shown in 1202 of FIG. 12, so that displacements of coordinates of actually placed dots from the positions of the grid are measured.

Finally, as shown in FIG. 13, a conversion is made from the displacements of the dots from the grid to actual data.

Next, described in detail is a method in which the first region decoding section 1406 and the second region decoding section 1407 extract embedded additional information.

First, the first region decoding section 1406 is described in detail.

The first region decoding section 1406 determines the size 1103 of the region 1101 shown in FIG. 11, the length of the repetition interval 1104 of the first region, and positions of the first regions 1101, so that additional information embedded in the first region 1101 is extracted.

First, the length of the repetition interval 1104 of the first region 1101 is determined. Since data in all the first regions 1101 are the same, when an autocorrelation is taken with a predetermined offset in a longitudinal direction of a sheet of paper, the autocorrelation is increased when an offset value matches the repetition interval length 1104. Therefore, the repetition interval length 1104 can be determined from the offset at which the autocorrelation becomes highest.

Figure 17:
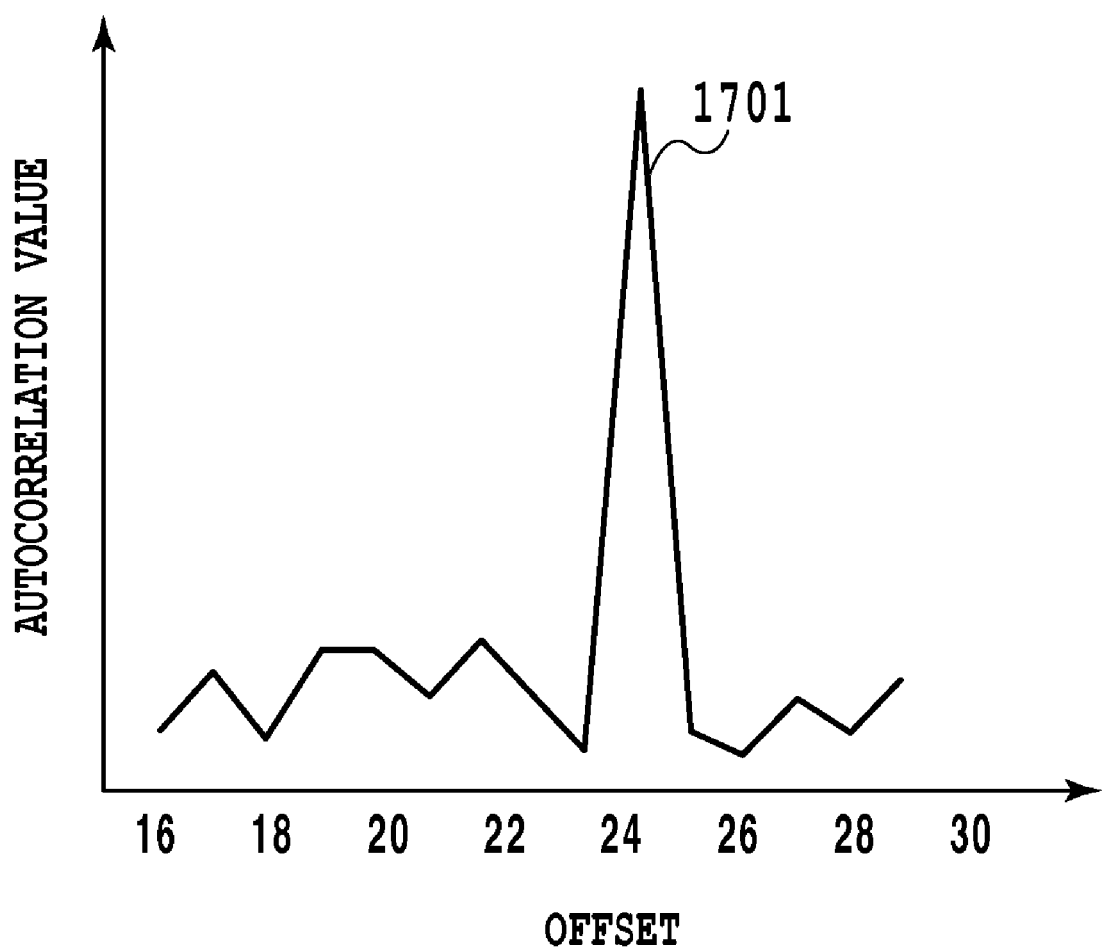
FIG. 17 is a view showing a graph indicative of autocorrelation values of an offset value in the first region in an embodiment of the present invention.

FIG. 17 shows a graph representing a relationship between an offset and an autocorrelation value.

For example, when the size 1103 of the first region 1101 shown in FIG. 11 is set to 8, and when the repetition size 1104 is set to 24, the autocorrelation value attains its peak, as shown in 1701 of FIG. 17, at which the offset is 24. Accordingly, the repetition size 1104 is determined to be 24.

Next, the positions of the first region 1101 and the size 1103 of the first region are determined. Although the repetition interval length 1104 of the first regions 1101 is determined from an autocorrelation value, it is necessary to determine the positions of the first regions 1101 and the size 1103 thereof.

Figure 18:
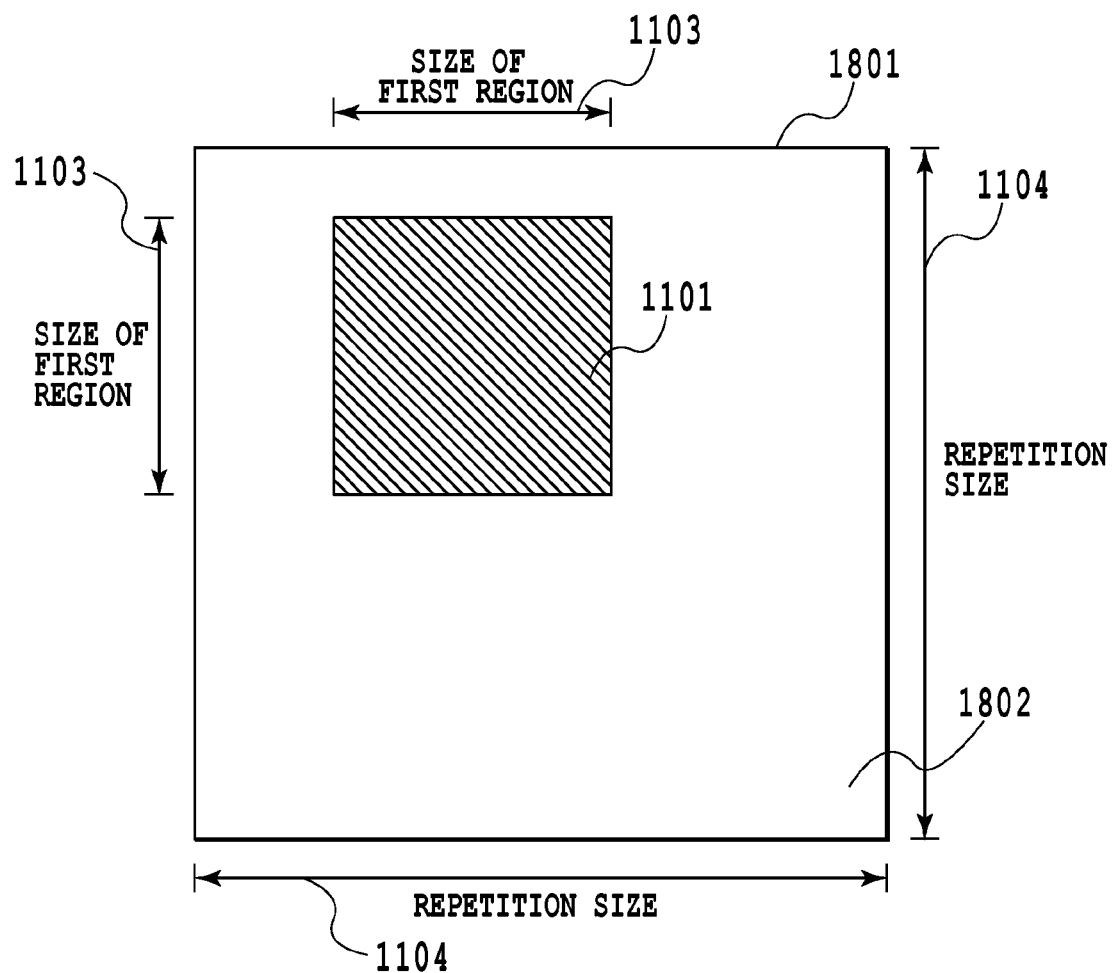
FIG. 18 is a view showing a method of determining the position of a first region in an embodiment of the present invention.

FIG. 18 is a view showing a method of determining the position of a first region 1101.

Since the repetition interval length 1104 has been determined, an arbitrary region corresponding to the repetition interval length is cut out from the relative coordinate list storage section 1405. Thereafter, an autocorrelation of a region neighboring thereto is obtained, and an autocorrelation of a region further neighboring thereto is also obtained. This process is repeated. Of those regions, correlations on the portions of the first regions 1101 are high since the same data cyclically appear on the first regions 1101 at fixed repetition interval length 1104. On the second region 1102, the same data do not appear at fixed repetition interval length 1104, so that correlations are low. Using this characteristic, a starting position of a portion on which a correlation is kept high is identified as a starting position of a first region 1101, and the distance from the starting position to a position where the portion on which a correlation is kept high is determined to be the size 1103 of the first region 1101.

With use of the position of the first region 1101 and the size 1103 thereof, additional information embedded in the first region 1101 is extracted. When extracting additional information from a single region only, a false determination may occur due to a measurement error and a noise. Therefore, positions of dots written in all the first regions 1101 are aggregated, and a mode value is employed, so that additional information is extracted. In a step in which additional information is extracted, the influence of noise and errors cannot be eliminated, so that an error correction processing is performed on an extracted result.

As described in FIG. 13, first, displacements of dots from a grid are extracted and converted into data corresponding to the positions of the displacements, whereby a sequence of data embedded in the first region 1101 is extracted. For a conventional technology, a number of error-correction codes have been made, but an LDPC (Low Density Parity Check) scheme is herein used. It has been known that the LDPC has high performance on error correction and exhibits a characteristic close to the Shannon limit. Detailed description on the LDPC is omitted. It is possible to use any scheme, not even the LDPC, so long as it has the characteristic of an error correction code. Use of an error correction code enables an extraction of embedded data even in the case where a certain amount of error or noise is contained in an extracted grid.

In addition, as described in the correction of rotation angles, since a correction processing of a rotation angel is performed in units of 90 degrees, for data extracted herein, there are four types: correct data; data obtained by rotating data by 90 degrees; data obtained by rotating data by 180 degrees; and data obtained by rotating data by 270 degrees. For extracted data, error corrections using LDPC are performed on results obtained by rotating the extracted data by 0 degree, 90 degrees, 180 degrees, and 270 degrees. Only for a correct rotation angle, an error correction code is caused to function so that data are normally extracted.

In accordance with the above-described processes, the first information embedded in the first region 1101 can be extracted.

Next, the second region decoding section 1407 is described in detail.

First, as in the first region 1101, an autocorrelation of the second region 1102 is taken. Second regions 1102 are embedded at multiple repetitive cycles of the first region 1101, so that it is only necessary to take an autocorrelation in multiples of any one of the numbers (e.g., 24, 48, 72, . . . ) of repetitions of the first regions 1101, which enables the omitting of a calculation. Further, on the second region 1102, a repetition size 1105 of the second region 1102 and the size of the second region 1102 have the same value. After taking an autocorrelation, the repetition size 1105 of the second region is calculated from a mode value.

Next, a starting position of a second region 1102 is identified. In order to synchronize a starting position of a first region 1101 and a starting position of a second region 1102 at the time of embedding, it is possible to narrow down the starting position of the second region 1102 to any one of starting positions of first regions 1101.

In determining the position of a second region 1102, an error correction code is used. Also in connection with the second region 1102 as well as the first regions 1101, an error correction code is added in addition to embedded data. Since the size 1105 of the second region 1102 is already known, an error correction processing is performed in sequence on the basis of prediction from a head position of the first regions 1101.

Figure 19:
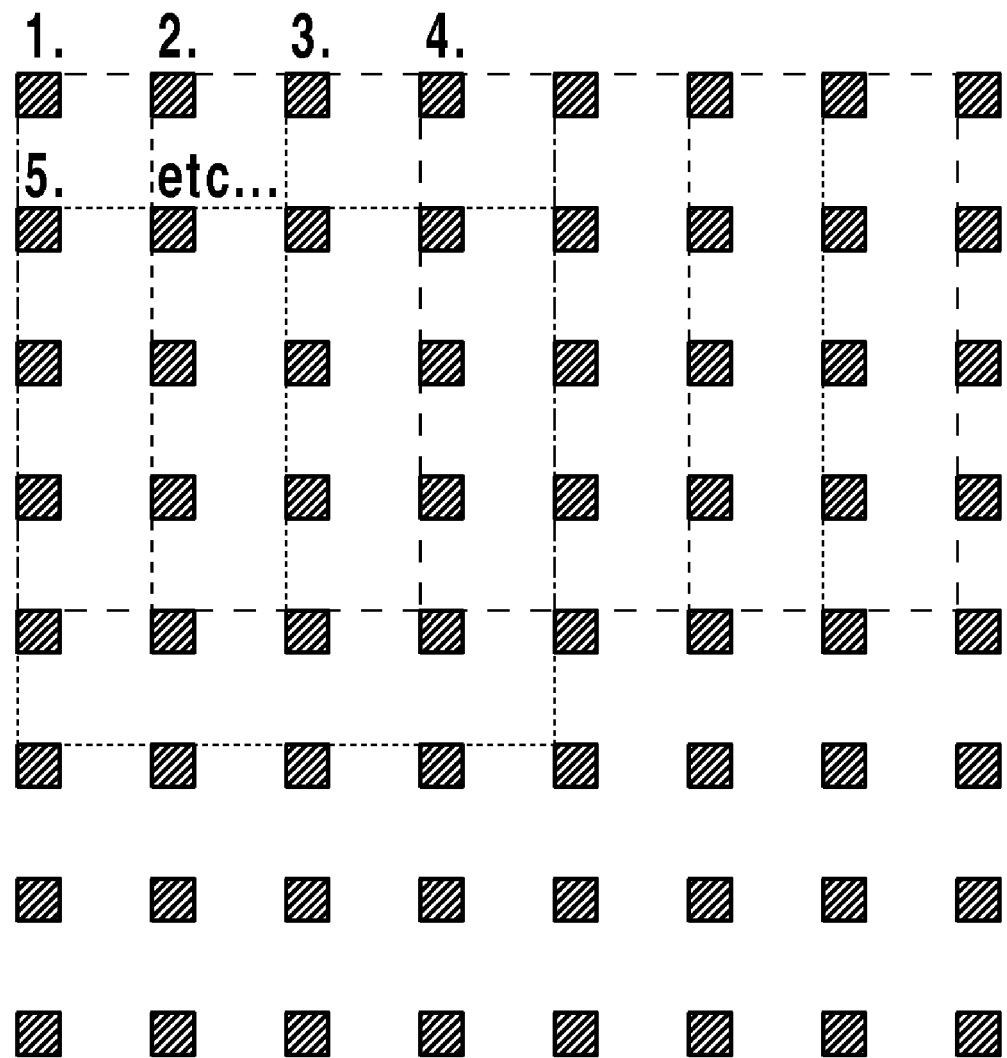
FIG. 19 is a view showing a method of determining the position of a second region in an embodiment of the present invention.

FIG. 19 is a view showing a method of determining a position of the second region 1102.

FIG. 19 shows that, in terms of autocorrelation, the size 1105 of the second region 1102 is four times the repetitive synchronization of the first regions 1101. Here, since any one of 4×4=16 becomes the starting position of the second region 1102, the error correction processing is performed while the position is moved to 1, 2, 3, 4, 5. When the error correction processing is successfully performed, the position can be used as the position of the second region 1102.

In accordance with the above-described processings, second information embedded in the second region 1102 can be extracted.

Details of the LVBC have been described above.

Other Embodiment

It is possible to apply the invention to a system including a plurality of devices (e.g., a computer, an interface device, a reader, a printer, and the like) or also to a device including a single device (an image forming apparatus, a printer, a fax machine, or the like).

In addition, a program code for achieving procedures of the flowcharts shown in the above-described embodiment can separately be stored in a computer-readable storage medium. Accordingly, an object of the invention is also achieved in such a way that a computer (or a CPU or an MPU) of a system or of an apparatus reads the program code from the computer-readable storage medium in which the program code is stored and executes the program. In this case, the program code itself, which is read from this storage medium, achieves functions of the above-described embodiment. Therefore, this program code and a computer-readable storage medium with this program code stored therein also configure one of the inventions.

For a storage medium supplying the program code, for example, the following can be used: a floppy disk, a hard disk, an optical disk, a magnetic optical disk, a CD-ROM, a CD-R, a magnetic tape, a nonvolatile memory card, and a ROM.

Functions of the above-described embodiment are not only achieved by a computer reading and executing the program code. These functions may also be achieved in such a way that an OS (an operating system) or the like operating on a computer on the basis of instructions of the program code performs part or all of actual processings.

In addition, the above-described functions are achieved in such a way that a CPU or the like provided to a function enhancement board inserted into a computer or to a function enhancement unit connected to a computer performs part or all of actual processings. In this case, the program code read from the above storage medium is written in a memory provided to a function enhancement board inserted into a computer or to a function enhancement unit connected to a computer, and thereafter, is executed by the above CPU or the like on the basis of instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-224024, filed Aug. 30, 2007, which s hereby incorporated by reference herein in its entirety.

What is claimed is:

1. An image forming apparatus including a display unit, comprising:
   an authorization unit configured to authorize a user to operate the image forming apparatus based on a first password input by the user via an operating section;
   a decoding unit configured to decode a two dimensional code within an image;
   a storage control unit configured to perform control of the apparatus to store the image in a storage unit, if a user has been authorized based on the first password and if the correctness of a second password entered by the authorized user through the operating section is authenticated by the information obtained by the decoding at the decoding unit; and
   a control unit configured
      to perform, when an instruction is given by an authorized user to display the image stored in the storage unit on the display unit, control of the apparatus to display the image on the display unit without requesting re-entry of the second password, and
      to perform, when an instruction is given by a user to display the image stored in the storage unit on a display unit of an external device, other than the display unit included in the image forming apparatus, control of the apparatus to request re-entry of the second password for displaying the image on the display unit of the external device.

2. The image forming apparatus according to claim 1, wherein when an instruction is given by the authorized user to form the image stored in the storage unit, control of the apparatus is performed to request re-entry of the second password for forming the image.

3. The image forming apparatus according to claim 1, wherein the apparatus lacks a print screen function for handling, as another file, an image displayed on the display unit of the image forming apparatus.

4. An image forming apparatus according to claim 1, further comprising:
   a setting unit configured to set, when transmitting data of the image to a device external to the image forming apparatus, a password for the entire image.

5. A control method for an image forming apparatus including a display unit, comprising the steps of:
   authorizing a user to operate the image forming apparatus based on a first password input by the user via an operating section;
   decoding a two dimensional code within an image;
   performing control of the apparatus to store the image in a storage unit, if a user has been authorized based on the first password and if the correctness of a second password entered by the authorized user through the operating section is authenticated by the information obtained by the decoding;
   performing, when an instruction is given by an authorized user to display the image stored in the storage unit on the display unit, control of the apparatus to display the image on the display unit without requesting re-entry of the second password; and performing, when an instruction is given by a user to display the image stored in the storage unit on a display unit of an external device, other than the display unit included in the image forming apparatus, control of the apparatus to request re-entry of the second password for displaying the image on the display unit of the external device.

6. The control method for the image forming apparatus according to claim 5, further comprising a step of performing, when an instruction is given by the authorized user to form the image stored in the storage unit, control of the apparatus to request re-entry of the second password for forming the image.

7. The control method for the image forming apparatus according to claim 5, wherein the apparatus lacks a print screen function for handling, as another file, an image displayed on the display unit of the image forming apparatus.

8. A computer-readable storage medium with a control program stored therein, the control program causing a control unit included in an image forming apparatus to perform the steps of:

authorizing a user to operate the image forming apparatus based on a first password input by the user via an operating section;

decoding a two dimensional code within an image;

performing control of the apparatus to store the image in a storage unit, if a user has been authorized based on the first password and if the correctness of a second password entered by the authorized user through the operating section is authenticated by the information obtained by the decoding;

performing, when an instruction is given by an authorized user to display the image stored in the storage unit on a display unit included in the image forming apparatus, control of the apparatus to display the image on the display unit included in the image forming apparatus without requesting re-entry of the second password; and performing, when an instruction is given by a user to display the image stored in the storage unit on a display unit of an external device, other than the display unit included in the image forming apparatus, control of the apparatus to request re-entry of the second password for displaying the image on the display unit of the external device.

\* \* \* \* \*